(12) United States Patent
Hidaka

(10) Patent No.: US 10,535,999 B2
(45) Date of Patent: Jan. 14, 2020

(54) POWER CONTROL SYSTEM, POWER CONTROL APPARATUS, AND POWER CONTROL METHOD

(71) Applicant: KYOCERA Corporation, Kyoto-shi, Kyoto (JP)

(72) Inventor: Hiroyuki Hidaka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/552,723

(22) PCT Filed: Feb. 25, 2016

(86) PCT No.: PCT/JP2016/001018
§ 371 (c)(1),
(2) Date: Aug. 22, 2017

(87) PCT Pub. No.: WO2016/136263
PCT Pub. Date: Jan. 9, 2016

(65) Prior Publication Data
US 2018/0041037 A1 Feb. 8, 2018

(30) Foreign Application Priority Data

Feb. 25, 2015 (JP) .................................. 2015-035719

(51) Int. Cl.
*H02J 3/32* (2006.01)
*H02J 7/00* (2006.01)
(Continued)

(52) U.S. Cl.
CPC .............. *H02J 3/32* (2013.01); *G05B 19/042* (2013.01); *G06Q 50/06* (2013.01); *H02J 7/0068* (2013.01);
(Continued)

(58) Field of Classification Search
CPC ............ H02J 3/32; H02J 7/0068; H02J 3/382; H01M 10/441; G05B 19/042; G05B 2219/2639; G06Q 50/06
See application file for complete search history.

(56) References Cited

U.S. PATENT DOCUMENTS 8,319,370 B2 * 11/2012 Itoh ........................ H02J 3/12
307/21
8,502,498 B2 * 8/2013 Fecher .................... B60L 53/63
320/109
(Continued)

FOREIGN PATENT DOCUMENTS

EP 2822140 A1 1/2015
JP 2008-029104 A 2/2008
(Continued)

OTHER PUBLICATIONS

International Search Report dated May 17, 2016, issued by Japan Patent Office for International Application No. PCT/JP2016/001018.
(Continued)

*Primary Examiner* — Charles R Kasenge
(74) *Attorney, Agent, or Firm* — Procopio Cory Hargreaves and Savitch LLP

(57) ABSTRACT

A power control system includes a storage cell and a power control apparatus. The storage cell is configured to allow allocation of predetermined storage capacities to a plurality of consumer facilities each including a load apparatus. The power control apparatus including a controller configured to control charging and discharging of the storage cell. The controller receives a charging or discharging instruction for the storage cell from the plurality of consumer facilities. The controller accepts a charging or discharging instruction newly received from one of the plurality of consumer facilities when an aggregated charging and discharging (Continued)

amount falls within a storage capacity allocated to the one of the plurality of consumer facilities.

16 Claims, 8 Drawing Sheets

(51) Int. Cl.
    *G06Q 50/06*     (2012.01)
    *G05B 19/042*     (2006.01)
    *H02J 3/38*     (2006.01)

(52) U.S. Cl.
    CPC ....... *G05B 2219/2639* (2013.01); *H02J 3/382* (2013.01)

(56) References Cited

U.S. PATENT DOCUMENTS

| | | | | |
|---|---|---|---|---|
| 8,571,720 B2* | 10/2013 | Yonezawa | ............... | H02J 3/14 700/291 |
| 8,952,656 B2* | 2/2015 | Tse | ............... | H02J 7/0013 320/109 |
| 8,957,634 B2* | 2/2015 | Lo | ............... | H02J 7/0027 320/109 |
| 9,595,844 B2* | 3/2017 | Kudo | ............... | H02J 3/32 |
| 9,862,286 B2* | 1/2018 | Mizuno | ............... | H02J 3/32 |
| 9,941,727 B2* | 4/2018 | Kudo | ............... | H02J 3/32 |
| 10,056,757 B2* | 8/2018 | Sakuma | ............... | H02J 3/32 |
| 2009/0094173 A1* | 4/2009 | Smith | ............... | G01R 21/1335 705/412 |
| 2010/0213762 A1* | 8/2010 | Itoh | ............... | H02J 3/12 307/18 |
| 2011/0047052 A1* | 2/2011 | Cornish | ............... | B60L 11/1861 705/30 |
| 2012/0065792 A1* | 3/2012 | Yonezawa | ............... | H02J 3/14 700/291 |
| 2012/0130556 A1* | 5/2012 | Marhoefer | ............... | H02J 3/32 700/291 |
| 2012/0181982 A1* | 7/2012 | Fecher | ............... | B60L 53/63 320/109 |
| 2012/0235646 A1* | 9/2012 | Lo | ............... | B60L 53/63 320/137 |
| 2012/0242148 A1* | 9/2012 | Galati | ............... | H02J 3/14 307/39 |
| 2014/0217989 A1* | 8/2014 | Kudo | ............... | H02J 3/32 320/134 |
| 2015/0002100 A1* | 1/2015 | Kudo | ............... | H02J 3/32 320/134 |
| 2015/0165917 A1* | 6/2015 | Robers | ............... | B60L 3/12 320/109 |
| 2015/0207323 A1* | 7/2015 | Baba | ............... | H02J 3/32 307/20 |
| 2015/0239362 A1* | 8/2015 | Mizuno | ............... | B60L 50/15 307/10.1 |
| 2016/0226249 A1* | 8/2016 | Sakuma | ............... | H02J 3/32 |
| 2017/0345107 A1* | 11/2017 | Hirata | ............... | G06Q 50/06 |

FOREIGN PATENT DOCUMENTS

| | | |
|---|---|---|
| JP | 2012-50211 A | 3/2012 |
| JP | 2013-169137 A | 8/2013 |
| JP | 2014-164169 A | 9/2014 |

OTHER PUBLICATIONS

Written Opinion of the International Searching Authority dated May 17, 2016, issued by Japan Patent Office for International Application No. PCT/JP2016/001018.

* cited by examiner

POWER CONTROL SYSTEM, POWER CONTROL APPARATUS, AND POWER CONTROL METHOD

CROSS REFERENCE TO RELATED APPLICATION

This application is a national stage application based on PCT Application No. PCT/JP2016/001018 filed on Feb. 25, 2016, which claims priority to and the benefit of Japanese Patent Application No. 2015-35719 filed on Feb. 25, 2015, the entire contents of which are incorporated herein by reference.

TECHNICAL FIELD

This disclosure relates to a power control system, a power control apparatus, and a power control method that utilize a stationary storage cell.

BACKGROUND

Conventionally, power companies supply power using a combination of a base-load power source capable of stably generating power throughout the year, a middle-load power source for generating power to meet a power demand while complementing the base-load power source, and a peak-load power source for generating power to meet a peak power demand in a peak power demand time zone. In this way, the power companies establish a power supply system that can meet the peak power demand in a stable manner.

A power source capable of generating power of a certain amount at all times at low unit cost is assigned as the base-load power source for main power generation. However, during late night hours, when the power demand typically decreases, the base-load power source may cause oversupply of power. As such, power companies, aiming to make effective use of surplus power generated during late night hours and ease the peak power demand during daytime hours, offer rate plans with a lower than normal rate for power used during late night hours and a higher than normal rate for power used in daytime hours to prompt, at low cost, consumers to shift their power demand from daytime to late night hours. As a method to reduce monthly electricity charges utilizing the power generated during late night hours, the use of a stationary storage cell is disclosed. For this reason, there is a demand for introduction of stationary storage cells to consumer facilities such as households and institutions.

SUMMARY

A power control system according to one embodiment includes a storage cell and a power control apparatus. The storage cell is configured to allow allocation of predetermined storage capacities to a plurality of consumer facilities each including a load apparatus. The power control apparatus including a controller configured to control charging and discharging of the storage cell. The controller receives a charging or discharging instruction for the storage cell from the plurality of consumer facilities. The controller accepts a charging or discharging instruction newly received from one of the plurality of consumer facilities when an aggregated charging and discharging amount falls within a storage capacity allocated to the one of the plurality of consumer facilities.

A power control apparatus according to one embodiment includes a controller. The controller is configured to control charging and discharging of a storage cell configured to allow allocation of predetermined storage capacities to a plurality of consumer facilities each including a load apparatus. The controller receives a charging or discharging instruction for the storage cell from the plurality of consumer facilities. The controller accepts a charging or discharging instruction newly received from one of the plurality of consumer facilities when an aggregated charging and discharging amount falls within a storage capacity allocated to the one of the plurality of consumer facilities.

A power control method according to one embodiment is a power control method of a power control apparatus including a controller configured to control charging and discharging of a storage cell configured to allow allocation of predetermined storage capacities to a plurality of consumer facilities each including a load apparatus. The power control method includes a step in which the controller receives a charging or discharging instruction for the storage cell from the plurality of consumer facilities. The power control method also includes a step in which the controller accepts a charging or discharging instruction newly received from one of the plurality of consumer facilities when an aggregated charging and discharging amount falls within a storage capacity allocated to the one of the plurality of consumer facilities.

DETAILED DESCRIPTION

First Embodiment

Figure 1:
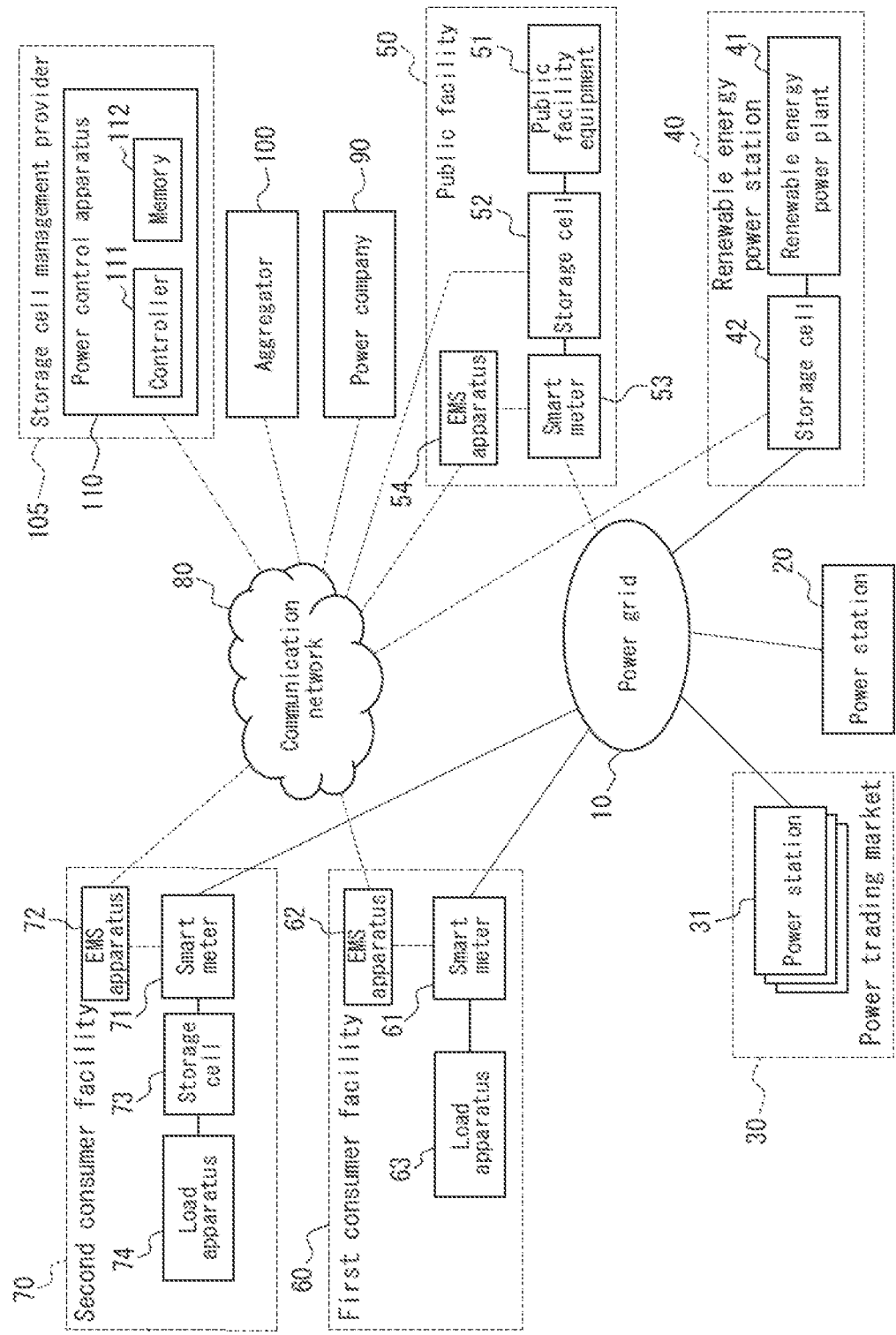
FIG. 1 is a diagram illustrating an overview of a power control system according to a first embodiment.

As illustrated in FIG. 1, a power control system according to the present embodiment includes a power station 20 configured to generate electricity, a power trading market 30 to sell and purchase power, a renewable energy power station 40 to supply renewable energy, and a public facility 50 to serve as a regional recovery base in the event of a disaster. The power control system also includes a consumer facility 60 including no stationary storage cells (hereinafter, also referred to as a first consumer facility 60) and a consumer facility 70 including a stationary storage cell (hereinafter, also referred to as a second consumer facility 70). The power station 20, the power trading market 30, the renewable energy power station 40, the public facility 50, the first consumer facility 60, and the second consumer facility 70 are each coupled to a power grid 10 configured to receive and supply power.

The power control system according to the present embodiment further includes a power company 90 that signs power supply-demand contracts with the first consumer facility 60 and the second consumer facility 70 and supplies power to them, an aggregator 100 configured as a power operator to handle "negawatt" transactions, and a storage cell management provider 105. The "negawatt" is a term representing power saved through energy conservation or private power generation and considered as representing generated power to be purchased by the power company and the like. The storage cell management provider 105 includes a power control apparatus 110. The power control apparatus 110 includes a controller 111 and a memory 112. The power company 90, the aggregator 100, the power control apparatus 110, the renewable energy power station 40, the public facility 50, the first consumer facility 60, and the second consumer facility 70 are each coupled to a communication network 80 and can communicate with one another.

The power trading market 30 includes a plurality of power stations 31 coupled to the power grid 10. In the power trading market 30, a power station operator who manages the power stations 31 and a consumer who wants to purchase power conduct a sales transaction. The power station operator supplies power to the consumer from the power station 31 via the power grid 10 in accordance with an established sales contract.

The renewable energy power station 40 includes a renewable energy power plant 41 to generate power from renewable energies such as the solar light, wind power, and wave power, and a storage cell 42. The storage cell 42 is coupled to the renewable energy power plant 41 and controlled to charge or discharge to counterbalance changes in power generation of the renewable energy. The storage cell 42 is coupled to the power grid 10 and discharges power to the power grid 10. The renewable energy power plant 41 may be directly coupled to the power grid 10.

The public facility 50 includes a public facility apparatus 51 configured as an apparatus that consumes power within the public facility 50, a storage cell 52 to supply power to the public facility apparatus 51, and a smart meter 53 to measure power supplied from the power grid 10 to the public facility 50. The public facility 50 includes an EMS apparatus 54 configured as an energy management apparatus that acquires power measured by the smart meter 53 and communicates with the aggregator 100 and the power control apparatus 110 via the communication network 80. The storage cell 52 is coupled to the power grid 10 via the smart meter 53. The public facility apparatus 51 may be coupled to the smart meter 53, in which case the public facility apparatus 51 can receive the power directly from the power grid 10.

When power is supplied from the power grid 10 during a normal operation, the public facility apparatus 51 receives the power from the power grid 10 while the storage cell 52 is controlled to charge. In this case, the public facility 50 serves as one of the consumer facilities. When power supply from the power grid 10 stops due to a disaster and the like, the storage cell 52 is controlled to discharge. The storage cell 52 supplies power to the public facility apparatus 51 such that the public facility 50 can function as the regional recovery base.

The first consumer facility 60 includes a smart meter 61 for measuring power supplied from the power grid 10 to the first consumer facility 60. The first consumer facility 60 also includes an EMS apparatus 62 that acquires power measured by the smart meter 61 and communicates with the aggregator 100 and the power control apparatus 110 via the communication network 80. The first consumer facility 60 further includes a load apparatus 63 inside the first consumer facility 60. The load apparatus 63 receives power supplied from the power grid 10 via the smart meter 61. When the power supply from the power grid 10 stops due to disasters and the like, the load apparatus 63 cannot receive power. The power control system may include a plurality of the first consumer facilities 60.

The second consumer facility 70 includes a smart meter 71 that measures power supplied from the power grid 10 to the second consumer facility 70. The second consumer facility 70 also includes an EMS apparatus 72 that acquires power measured by the smart meter 71 and communicates with the aggregator 100 and the power control apparatus 110 via the communication network 80. The second consumer facility 70 further includes a storage cell 73 to store power supplied from the power grid 10. The second consumer facility 70 further includes a load apparatus 74 inside the second consumer facility 70. The storage cell 73 is coupled to the power grid 10 via the smart meter 71. The load apparatus 74 may be coupled to the smart meter 71, in which case the load apparatus 74 may directly receive the power supply from the power grid 10.

When power is supplied from the power grid 10 during the normal operation, the load apparatus 74 receives the power from the power grid 10, while the storage cell 73 is controlled to store the power. When the power supply from the power grid 10 stops due to disasters and the like, the storage cell 73 is controlled to discharge and supply power to the load apparatus 74.

The storage cell management provider 105 provides a virtual storage cell utilization agreement to the first consumer facility 60. The virtual storage cell utilization agreement is a service to allow the first consumer facility 60 to utilize a storage cell virtually. In particular, the power control apparatus 110 of the storage cell management provider 105 allocates, to the first consumer facility 60, a portion (a predetermined storage capacity) of a storage capacity of a storage cell coupled to the load apparatus 63 of the first consumer facility 60 via the power grid 10. The power control apparatus 110 receives a charging or discharging instruction for the storage cell from the first consumer facility 60. The storage cell management provider 105 is, for example, a business entity independent of the power company or the power operator. Alternatively, the storage cell management provider 105 may be included in the power company or the power operator, in which case the power company or the power operator may provide the virtual storage cell utilization agreement.

The power control apparatus 110 is coupled, via the communication network 80, to the storage cell 42 of the renewable energy power station 40, the storage cell 52 of the public facility 50, the EMS apparatus 62 of the first consumer facility 60, and the EMS apparatus 72 of the second consumer facility 70. The controller 111 of the power control apparatus 110, in accordance with storage cell management policies of the storage cell management provider 105, controls charging and discharging of the storage cell 42 of the renewable energy power station 40 and of the storage cell 52 of the public facility 50. Also, the controller 111 saves data in the memory 112.

Comparative Example: Consumer Facility Including Stationary Storage Cell

Figure 2:
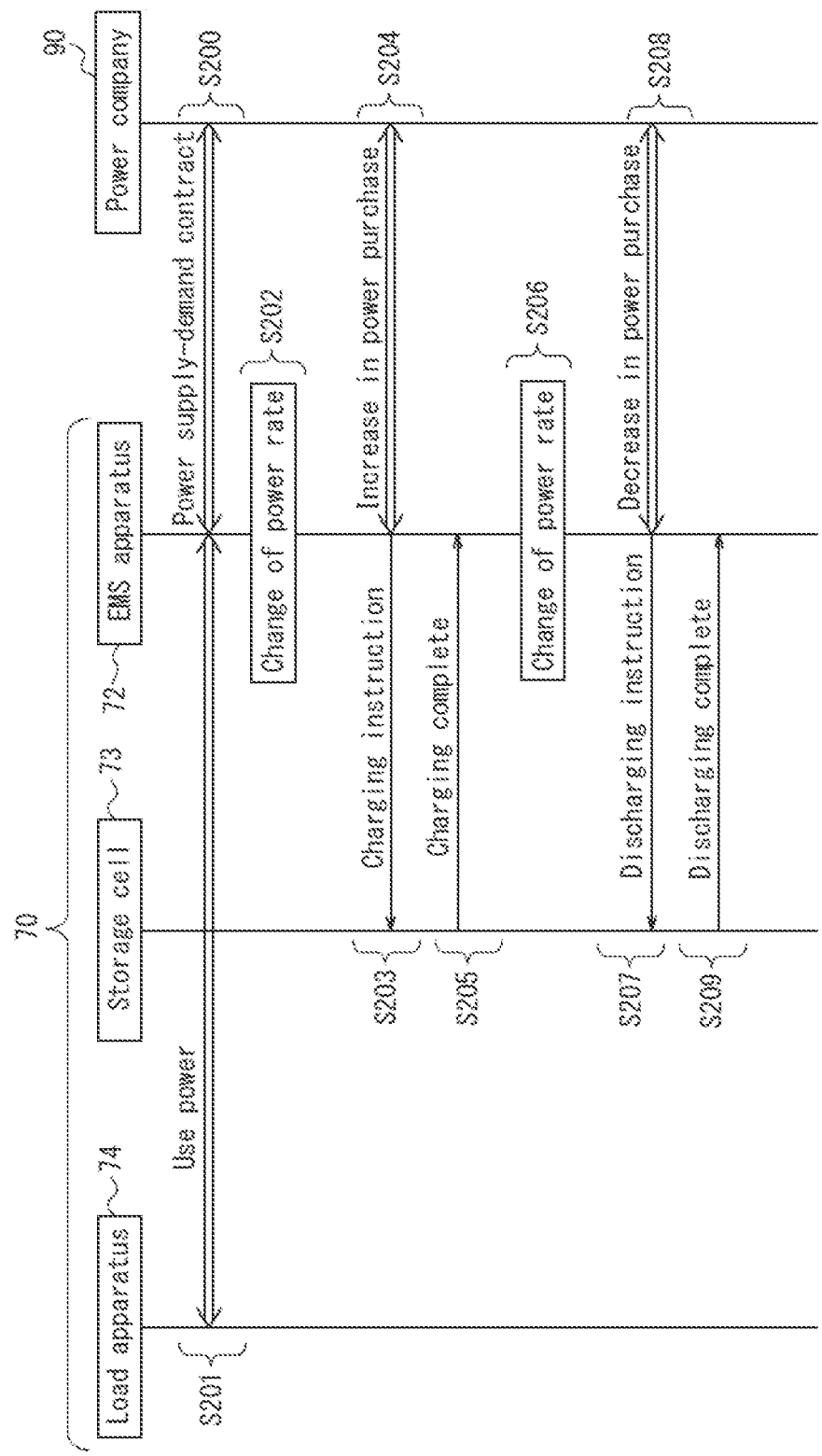
FIG. 2 is a diagram illustrating a sequence employed by a consumer facility including a stationary storage cell to use the storage cell.

To facilitate understanding of the virtual storage cell utilization agreement, an advantage received by the second consumer facility 70 by utilizing the storage cell 73 installed therein will be described below as a comparative example of the first embodiment. As illustrated in FIG. 2, the consumer having the second consumer facility 70 signs the power supply-demand contract with the power company 90 and receives a power supply service (S200). The second consumer facility 70 operates the load apparatus 74 on power supplied through the power grid 10 (S201).

To reduce an electricity charge by utilizing the storage cell 73, the consumer having the second consumer facility 70 signs, with the power company 90, a power supply-demand contract including a variable rate plan with different power rates for different time zones. This variable rate plan is assumed to include a low power rate for power use in late night hours during which the power demand becomes lower than power generated by the base-load power source.

The second consumer facility 70 uses a timer function of the EMS apparatus 72 or the storage cell 73 and, when the late night hours corresponding to the low power rate begin (S202), issues a charging instruction for the storage cell 73 (S203). This offers, to the power company 90, an advantage of increasing the power demand (power purchased by the consumer facility) during late night hours (S204) and, to the second consumer facility 70, an advantage of charging the storage cell 73 at low cost during late night hours (S205).

The second consumer facility 70, when daytime hours corresponding to the high power rate begin (S206), issues a discharging instruction for the storage cell 73 (S207). This offers, to the power company 90, an advantage of reducing the power demand (power purchased by the consumer facility) during daytime hours (S208) and eases the peak power demand and, to the second consumer facility 70, an advantage of reducing power consumption during daytime corresponding to the high power rate by discharging the storage cell 73 (S209).

Figure 3:
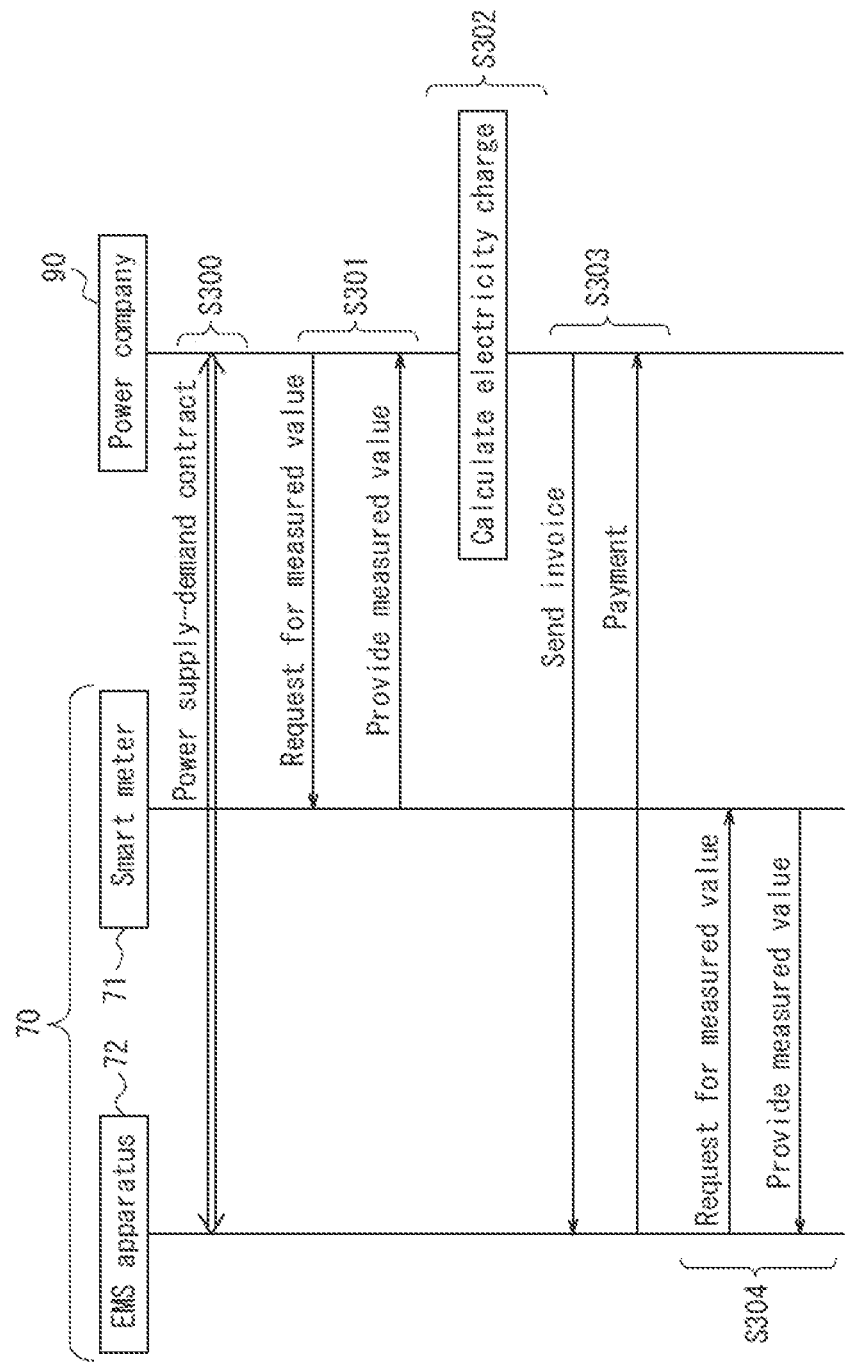
FIG. 3 is a diagram illustrating a sequence to calculate an electricity charge for the consumer facility including the stationary storage cell.

As illustrated in FIG. 3, the consumer having the second consumer facility 70 and the power company 90 sign the power supply-demand contract (S300). The power company 90 periodically, such as at the end of the month, at the beginning of the month, and in the middle of the month, determines a value measured by the smart meter 71 installed in the second consumer facility 70, and acquires data indicative of the electrical energy supplied from the power grid 10 to the second consumer facility 70 (S301). The power company 90 calculates the electricity charge on the basis of the data and the power rate plan signed by the consumer having the second consumer facility 70 (S302). The power company 90 sends an invoice to the consumer having the second consumer facility 70 and receives a payment (S303). The value measured by the smart meter 71 can also be checked by the second consumer facility 70 using the EMS apparatus 72 or the like (S304).

In this way, the second consumer facility 70 may reduce the electricity charge by using the storage cell 73 and taking advantage of a difference in the power rates between daytime and midnight hours. Also, there is an advantage for the power company 90 to be able to ease the peak power demand.

Example: Virtual Storage Cell Utilization Agreement

Next, the virtual storage cell utilization agreement offered by the storage cell management provider 105 to the first consumer facility 60 using the power control system according to the present embodiment will be described. Here, the load apparatus 63 of the first consumer facility 60 is coupled to the storage cells, e.g., storage cells 42 and 52 that are virtually available to the first consumer facility 60 via the power grid 10. A similar agreement may be offered also to the second consumer facility 70.

Figure 4:
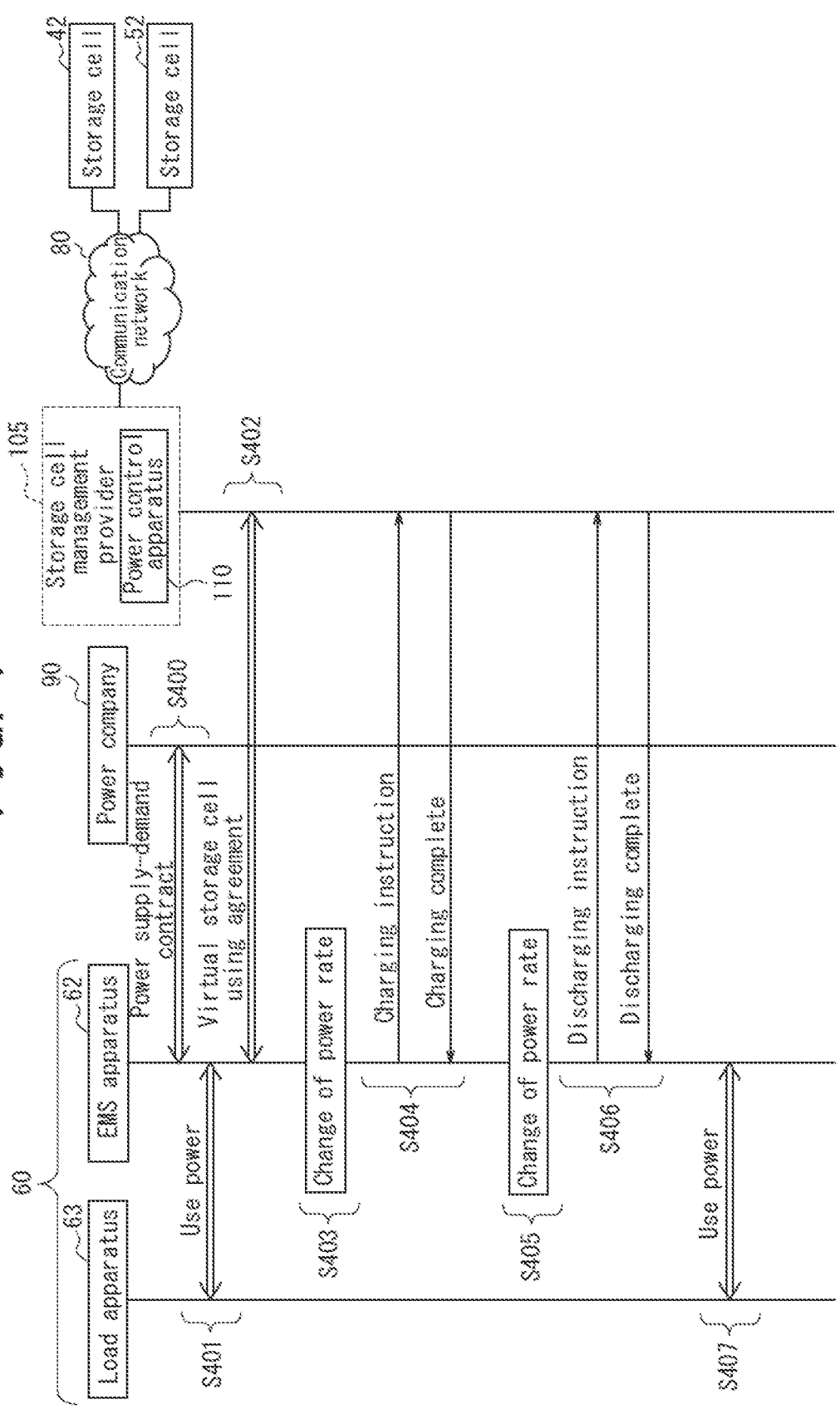
FIG. 4 is a diagram illustrating a sequence to provide service in accordance with a virtual storage cell utilization agreement to a consumer facility including no stationary storage cells.

As illustrated in FIG. 4, the first consumer facility 60 signs the power supply-demand contract with the power company 90 and receives the power supply service (S400). The first consumer facility 60 operates the load apparatus 63 on the supplied power (S401). The consumer having the first consumer facility 60 signs, with the power company 90, a power supply-demand contract including a variable rate plan with different power rates for different time zones. This variable rate plan may be similar to that of the contract signed by the consumer having the second consumer facility 70 and the power company 90.

The consumer having the first consumer facility 60 signs a virtual storage cell utilization agreement with the storage cell management provider 105 (S402). On the basis of this agreement, the first consumer facility 60 may use the storage cell coupled to the first consumer facility 60 virtually via the power grid 10. This eliminates the necessity for the first consumer facility 60 to actually install a storage cell.

The virtual storage cell utilization agreement includes a storage capacity and an output that are allocated to the first consumer facility 60. The storage capacity refers to the electrical energy that can be stored in the storage cell. The first consumer facility 60 can issue the charging or discharging instruction as long as a charging and discharging amount obtained through aggregation of charging or discharging instructions from the first consumer facility falls within the storage capacity allocated to the first consumer facility 60. The output refers to a rated output when the storage cell discharges, i.e., an agreed amperage in a typical power supply-demand contract. A discharging instruction issued by the first consumer facility 60 on the basis of its power demand must fall within the output allocated to the first consumer facility 60.

The controller 111 of the power control apparatus 110, to the first consumer facility 60 including signed the virtual storage cell utilization agreement, allocates predetermined storage capacities, i.e., portions of power storage capacities of the storage cells 42 and 52. The controller 111 also allocates predetermined outputs, i.e., portions of the rated outputs of the storage cells 42 and 52 to the first consumer facility 60. The controller 111 may allocate the predetermined storage capacities to a plurality of consumer facilities in such a manner that a total of allocated storage capacities falls within the storage capacities of the storage cells 42 and 52. In this way, the storage cell management provider 105 may reduce the risk of breaching the virtual storage cell utilization agreement. The storage cell management provider 105, when the total of the storage capacities allocated to the plurality of consumer facilities by the controller 111 exceeds the storage capacities of the storage cells 42 and 52, may obtain a storage capacity in an amount of such an excess from another power company or power operator. In this way, the storage cell management provider 105 may ensure the freedom to expand a business to provide the virtual storage cell utilization agreement.

The consumer having the first consumer facility 60 signs the power supply-demand contract of the variable rate plan with different power rates for different time zones. Therefore, the consumer, by virtually utilizing the storage cell under the virtual storage cell utilization agreement, may reduce their electricity charge.

The first consumer facility 60, by utilizing the EMS apparatus 62 or a WEB interface of the power control apparatus 110 of the storage cell management provider 105, issues a charging instruction to the controller 111 of the power control apparatus 110 when late night hours corresponding to the low power rate begin (S403). The controller 111, upon receiving the charging instruction from the first consumer facility 60, controls the storage cell 42 or 52 under management of the storage cell management provider 105 to charge (S404). Also, the controller 111 saves the charging instruction in the memory 112 of the power control apparatus 110. In this case, power corresponding to the charging instruction received from the first consumer facility 60 may or may not be actually stored in the storage cells 42 or 52.

The first consumer facility 60, when the daytime hours corresponding to the high power rate begin (S405), issues the discharging instruction to the controller 111 of the power control apparatus 110. The controller 111, upon receiving the discharging instruction from the first consumer facility 60, controls the storage cell 42 or 52 under the management of the storage cell management provider 105 to discharge (S406). Also, the controller 111 saves the discharging instruction in the memory 112 of the power control apparatus 110. In this case, power corresponding to the discharging instruction received from the first consumer facility 60 may or may not be actually discharged from the storage cell 42 or 52. The first consumer facility 60 operates the load apparatus 63 on supplied power (S407).

The controller 111 of the power control apparatus 110 calculates the charging and discharging amount of the first consumer facility 60 by aggregating the charging or discharging instructions saved in the memory 112 of the power control apparatus 110. The controller 111, upon newly receiving the charging or discharging instruction from the first consumer facility 60, determines whether the charging and discharging amount of the first consumer facility 60 reflecting the charging or discharging instruction newly received falls within the storage capacity allocated to the first consumer facility 60. In the case where the charging and discharging amount falls within the storage capacity, the controller 111 accepts the charging or discharging instruction newly received, saves this charging or discharging instruction in the memory 112, and controls the storage cell 42 or 52 to charge or discharge. On the other hand, in the cases where the charging and discharging amount does not fall within the storage capacity, the controller 111 does not accept the charging or discharging instruction newly received and does not save the charging or discharging instruction in the memory 112.

Here, the electrical energy measured by the smart meter 61 of the first consumer facility 60 includes the electrical energy received by first consumer facility 60 directly from the power grid 10 but excludes the electrical energy associated with the charging or discharging instruction received from the first consumer facility 60. The electrical energy associated with the charging or discharging instruction received from the first consumer facility 60 is calculated by aggregating the charging or discharging instructions saved in the memory 112.

Figure 5:
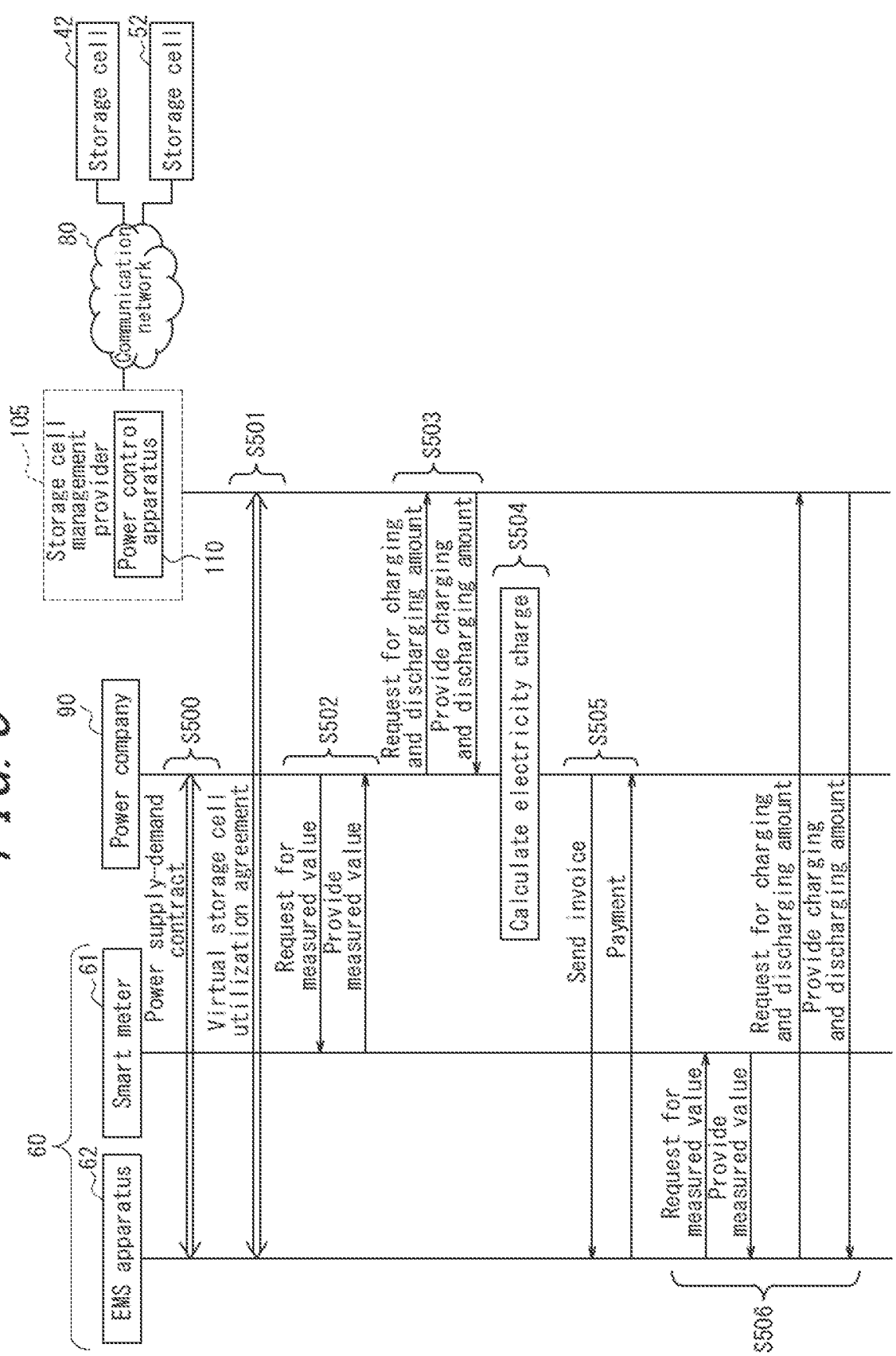
FIG. 5 is a diagram illustrating a sequence to calculate an electricity charge for the consumer facility including no stationary storage cells by including a charging and discharging amount obtained through aggregation of charging or discharging instructions saved in a memory.

As illustrated in FIG. 5, the consumer having the first consumer facility 60 and the power company 90 sign the power supply-demand contract (S500). The consumer having the first consumer facility 60 also signs the virtual storage cell utilization agreement with the storage cell management provider 105 (S501).

The power company 90 periodically, such as at the end of the month, at the beginning of the month, and in the middle of the month, determines a value measured by the smart meter 61 installed in the first consumer facility 60, and acquires the electrical energy data indicative of the power supplied from the power grid 10 to the first consumer facility 60 (S502).

Subsequently, the power company 90 acquires, from the power control apparatus 110 of the storage cell management provider 105, the charging and discharging amount of the first consumer facility 60 on the basis of the charging or discharging instructions from the first consumer facility 60 (S503).

Next, the power company 90 calculates the electricity charge of the first consumer facility 60 on the basis of the electrical energy data and the charging and discharging amount of the first consumer facility 60, as well as the rate plan for the consumer having the first consumer facility 60 (S504). Alternatively, the controller 111, instead of the power company 90, may calculate the electricity charge. In this case, the controller 111 acquires the electrical energy data of the first consumer facility 60 from the smart meter 61 of the first consumer facility 60. When the rate plan signed by the consumer having the first consumer facility 60 is the plan with different rates for different time zones of the day, the power company 90 may calculate the electricity charge on the basis of the charging and discharging amount obtained through aggregation of the charging or discharging instructions received from the first consumer facility 60 in each time zone.

Then, the power company 90 sends an electricity charge calculated in the foregoing manner to the consumer having the first consumer facility 60 and receives payment (S505).

The power amount data and the charging and discharging amount of the first consumer facility 60 can also be checked by the first consumer facility 60 using the EMS apparatus 62 or the like (S506).

Here, the storage cell management provider 105, in consideration of the virtual storage cell utilization agreement with the first consumer facility 60, receives a virtual storage cell usage fee from the consumer having the first consumer facility 60. The virtual storage cell usage fee may be collected together with the electricity charge by the power company 90 from the consumer having the first consumer facility 60, or directly collected by the storage cell management provider 105. The virtual storage cell usage fee may be applied to an amortization of installation cost of the storage cell. In this way, an installer of the storage cell (a person who entrusts operation of the storage cell to the storage cell management provider 105, or the storage cell management provider 105 itself) may reduce the cost burden for installation of the storage cell and thus may easily install the storage cell.

Figure 6:
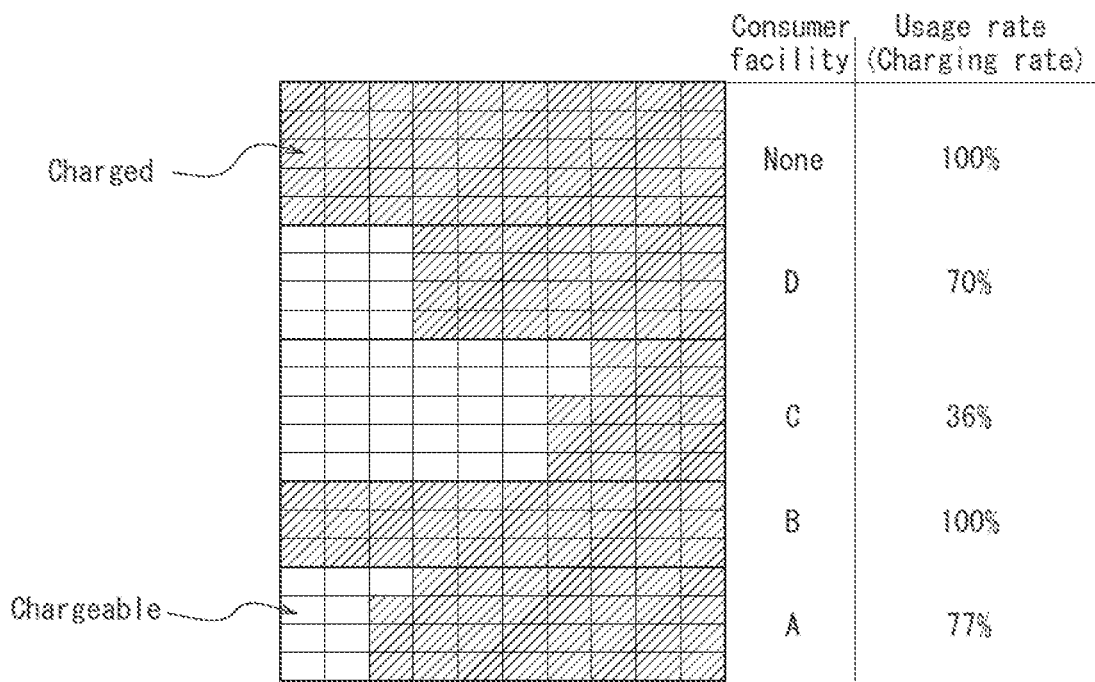
FIG. 6 is a diagram illustrating utilization rates (charging rates) of the storage cell of a storage cell management provider with respect to the capacity allocated to each consumer facility.

In FIG. 6, shaded areas with forward slashes (/) represent charged portions, and blank areas represent chargeable areas which are uncharged. In FIG. 6, storage capacities are allocated to the consumer facilities A, B, C, and D, and 77%, 100%, 36%, and 70% of these respective storage capacities are charged. The capacity (None) that is not allocated to a consumer facility is 100% charged.

Figure 7:
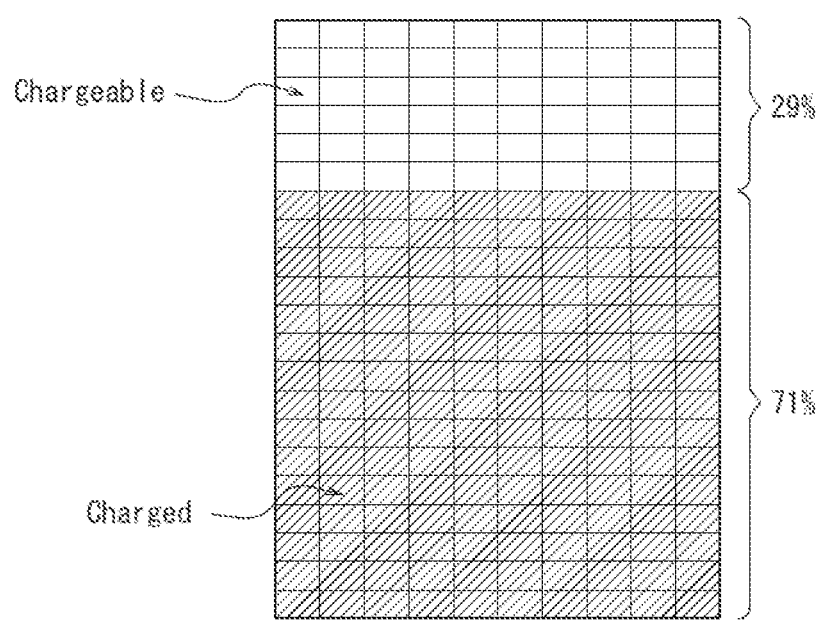
FIG. 7 is a diagram of a utilization rate (a charging rate) of the entire capacity of the storage cell of the storage cell management provider.

FIG. 7 does not distinguish between the storage capacities allocated to the consumer facilities. The shaded areas and the blank areas are defined similarly to those of FIG. 6. In FIG. 7, in the storage cell under the control of the power control apparatus 110 of the storage cell management provider 105, 71% of a total capacity is charged, and 29% of the total capacity is chargeable.

The power control apparatus 110 of the storage cell management provider 105 may manage a plurality of storage cells. Also, the storage cell management provider 105 may control a plurality of storage cells by summing the capacities of the plurality of storage cells as one storage cell.

The controller 111 of the power control apparatus 110 does not have to be restricted by the charging or discharging instruction received from the first consumer facility 60 when controlling the storage cell under the control of the controller 111 to charge or discharge. The controller 111 of the power control apparatus 110 may prioritize control in accordance with an installation purpose for the storage cell under the control of the controller 111. For example, the storage cell 42 of the renewable energy power station 40 is controlled to charge or discharge, giving priority to storage of surplus power generated by the renewable energy power plant 41. Or, the storage cell 52 of the public facility 50 is controlled to charge or discharge, giving priority to a power consumption state of the public facility 50.

The virtual storage cell utilization agreement for the power control system according to the present embodiment allows the consumer facility to issue the charging or discharging instruction for a storage cell that is not directly coupled to an apparatus of the consumer facility.

The power control system according to the present embodiment allows a consumer facility including no storage cells to benefit from a reduction in the electricity charge by utilizing the difference in the power rates between daytime and late night hours as in the case where storage cells are installed. In other words, the consumer having the consumer facility with no storage cells needs to simply pay the virtual storage cell usage fee to the storage cell management provider 105 and does not need to actually install the storage cell. Therefore, the necessity of initial investment for installation of the storage cell is eliminated. On the other hand, the storage cell management provider 105 collects a payment from the consumer having the consumer facility, which facilitates the amortization of the storage cell and offsets the installation cost of the storage cell. Therefore, introduction cost of the storage cell is reduced, facilitating the introduction of the storage cell.

Also, offering the advantage of having the storage cell installed without requiring actual installation of the storage cell enables development of a trial service of the storage cell. In other words, the consumer having the consumer facility may experience the advantages of having the storage cell installed through the use of the virtual storage cell, which may encourage the consumer to install the stationary storage cell in their consumer facility. Also, usage results of the virtual storage cell allows an estimation of an optimal storage capacity for the consumer facility, preventing or reducing excess or deficiency of the storage capacity after the introduction of the stationary storage cell.

Note that the load apparatus 63 of the first consumer facility 60 is coupled to the storage cell via the power grid 10. Therefore, when the power supply from the power grid 10 stops, the load apparatus 63 cannot receive the power supply. On the other hand, the load apparatus 74 of the second consumer facility 70 can receive the power supply from the storage cell 73 even when the power supply from the power grid 10 stops. Therefore, the advantage of utilizing the virtual storage cell does not encompass all of the advantages of having the stationary storage cell installed.

In other words, there are two advantages of having the stationary storage cell installed.

One of the advantages is securing a reduction in the electricity charge resulting from the difference in the power rates between daytime and late night hours by using the storage cell while receiving the power supply from the power grid 10 during the normal operation. The consumer may have this advantage simply by signing the virtual storage cell utilization agreement according to the present embodiment without installing the stationary storage cell in the consumer facility. That is, this advantage is independent of the installation location of the storage cell.

The other advantage is having a backup power source in the case that the power supply from the power grid 10 stops. To have this advantage, the consumer needs to have the stationary storage cell installed in the consumer facility of the consumer. That is, this advantage is dependent on the installation location of the storage cell.

According to the power control system of the present embodiment, by using the virtual storage cell in accordance with the virtual storage cell utilization agreement, the advantages of introducing the storage cell may be divided into advantages which are dependent on the installation location and advantages which are independent of the installation location. Therefore, the power control system can simultaneously meet the requirements from consumer facility in need of the advantages on one side and the requirements from another consumer facility in need of the advantages from the other side.

Example: Using Virtual Storage Cell Usage Agreement in Relation to a Consumer Facility Including Stationary Storage Cell The second consumer facility 70, as described in the comparative example of the first embodiment, may benefit from the advantage of having the storage cell 73 installed, without using the storage cell of the storage cell management provider 105. However, the stationary storage cell, as an apparatus, has a fixed upper limit of the storage capacity. Here, when the consumer having the second consumer facility 70 signs the virtual storage cell utilization agreement provided by the storage cell management provider 105, the consumer may issue charging instructions even if the storage cell 73 of the second consumer facility 70 is already charged to the upper limit of its storage capacity. Also, the consumer may issue discharging instructions even if the storage cell 73 has a low level of charge. In this manner, the virtual storage cell utilization agreement according to the present embodiment offers advantages also to the consumer having the second consumer facility 70. When the consumer having the second consumer facility 70 signs the virtual storage cell utilization agreement with the storage cell management provider 105, the storage cell management provider 105 may allocate portions of the storage capacities (predetermined storage capacities) of the storage cells 42 and 52 to the second consumer facility 70. In particular, the power control apparatus 110 of the storage cell management provider 105 allocates, to the second consumer facility 70, portions of the storage capacities (the predetermined storage capacities) of the storage cells coupled to the second consumer facility 70 via the power grid 10. The power control apparatus 110 receives the charging or discharging instruction for the storage cell from the second consumer facility 70.

Example: Control Performed when Sharing Storage Capacity of Stationary Storage Cell According to the first embodiment, portions of the storage capacities and outputs of the storage cells 42 and 52 are allocated to the first consumer facility 60 or the second consumer facility 70. Then, the first consumer facility 60 or the second consumer facility 70 may issue the charging or discharging instruction within the range of the storage capacities and the outputs that are allocated thereto.

Here, the charging or discharging instruction issued by the first consumer facility 60 or the second consumer facility 70 are virtual only. The storage capacities allocated to the consumer facilities can be readily changed. This point differs from that of the stationary storage cell installed in the facility including the fixed upper limit of the storage capacity. That is, the virtual storage cell utilization agreement used in the power control system according to the first embodiment allows the storage capacities and outputs allocated to the consumer facilities to be shared among them and lent to one another.

Figure 8:
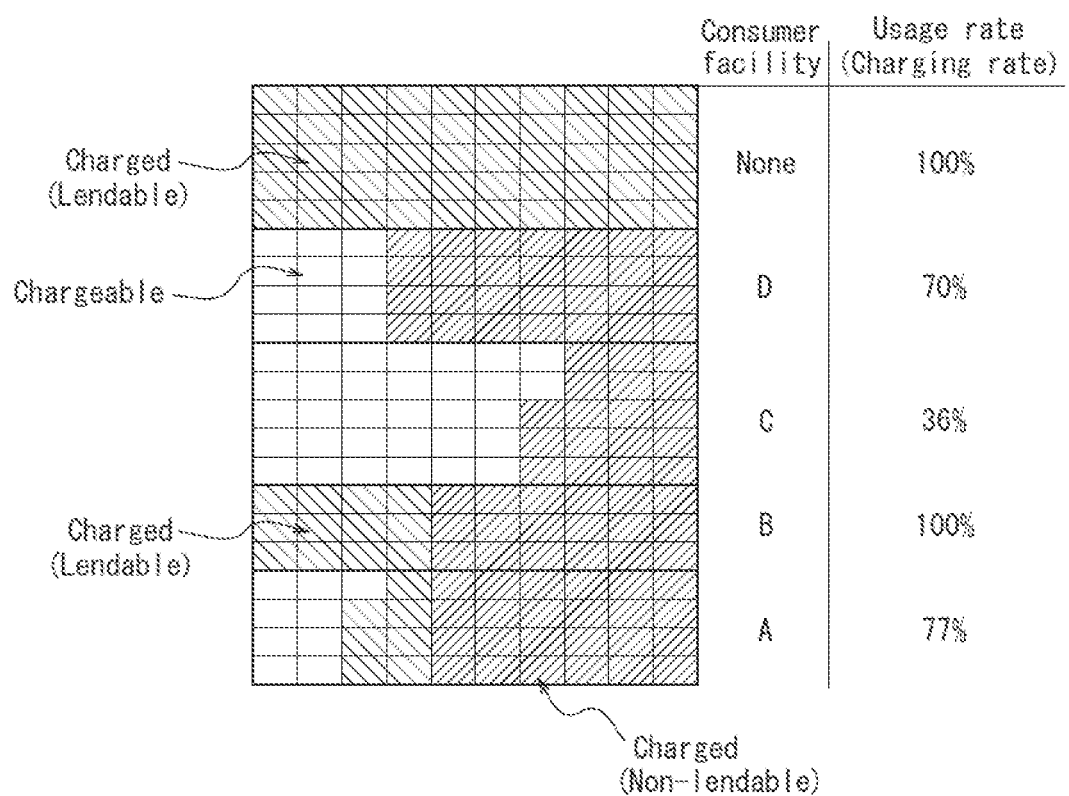
FIG. 8 is a diagram illustrating, out of the utilization rates of the consumer facilities illustrated in FIG. 6, charging amounts that can be allocated to another consumer facility.

In FIG. 8, areas with forward slashes (/) and areas with backslashes (\) represent charged areas, and blank areas represent chargeable areas. Here, the areas with the backslashes represent, out of charged areas, areas that may be lent to another consumer facility. In FIG. 8, some of the charged areas allocated to the consumer facilities A and B and the entire capacity that is not allocated to a consumer facility (None) may be lent to another consumer facility.

Figure 9:
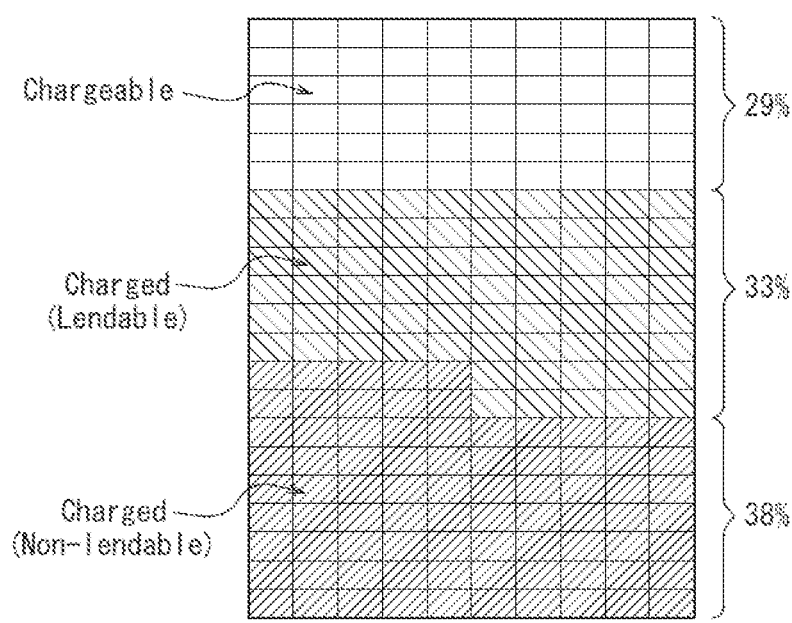
FIG. 9 is a diagram illustrating, out of the utilization rate of the entire capacity of the storage cell illustrated in FIG. 7, a charging amount that can be allocated to another consumer facility.

In FIG. 9, shaded areas with the forward slashes, shaded areas with the backslashes, and blank areas are defined similarly to those of FIG. 8. In FIG. 9, 33% of a total charged amount of the storage cell may be lent to another consumer facility, i.e., available to any one of the consumer facilities.

As illustrated in FIG. 8 and FIG. 9, the charged amount of the total charged amount of the storage cell that is available to any one of the consumer facilities facilitates charging or discharging instructions which exceed the storage capacities allocated to the consumer facilities. For example, when consumer facility C needs power in excess of the changed amount allocated thereto, consumer facility C may avoid use of the power supplied from the power grid 10 at a relatively high rate by using the charging amount that is available to be lent.

According to the present embodiment, the storage capacities allocated to the consumer facilities may be lent to one another. According to the present embodiment, therefore, a charging or discharging instruction from the consumer facility may be accepted even when the charging and discharging amount calculated on the basis of the charging or discharging instructions from the consumer facility does not fall within the range of the charging capacity allocated to the consumer facility. When receiving a charging or discharging instruction from the consumer facility, the controller 111 may reduce a storage capacity allocated to another consumer facility or the storage capacity that is not allocated to any consumer facility by a storage capacity corresponding to the charging and discharging amount exceeding the storage capacity allocated to the consumer facility, and allocate the storage capacity to the consumer facility.

An excess charge may be imposed on a consumer facility which is allocated additional storage capacity after exceeding its allocated storage capacity. Also, a consumer facility which has its storage capacity reduced for allocation to another consumer facility, i.e., the consumer facility that lends the charged amount to another consumer facility, may receive an incentive. In this way, both of the consumer facilities involved in lending and borrowing the charged amount may enjoy benefits. Alternatively, the consumer facility exceeding the storage capacity allocated thereto may change the contract to temporarily increase the storage capacity and may be charged in accordance with the contract. In this way, the storage cell management provider 105 may also enjoy a benefit.

Example: Control of Storage Cell of Renewable Energy Power Station

Now, an example of control of the storage cell 42 of the renewable energy power station 40 illustrated in FIG. 1 performed by the controller 111 of the power control apparatus 110 will be described. The renewable energy power station 40 includes the renewable energy power plant 41 and the storage cell 42. The controller 111 is coupled to the storage cell 42 of the renewable energy power station 40 via the communication network 80 and controls the storage cell 42.

The controller 111 controls the storage cell 42 to store power generated by the renewable energy power plant 41. Also, the controller 111 receives a charging or discharging instruction from the first consumer facility 60 or the second consumer facility 70. In this case, the controller 111 controls the storage cell 42 whilst prioritizing prevention of fluctuations in the power generated by the renewable energy power plant 41. That is, the controller 111 controls the storage cell 42 without necessarily following the charging or discharging instruction received from the first consumer facility 60 or the second consumer facility 70.

The controller 111 of the power control apparatus 110 saves the charging or discharging instruction received from the first consumer facility 60 or the second consumer facility 70 in the memory 112. Then, the controller 111, in accordance with the charging and discharging amount on the basis of the saved charging or discharging instructions, calculates a difference (a difference resulting from discharging, in the time zone corresponding to the high power rate, the power charged in the time zone corresponding to the low power rate) for the first consumer facility 60 and the second consumer facility 70. In this way, the first consumer facility 60 or the second consumer facility 70 has the advantage to reducing their electricity charge.

On the other hand, the renewable energy power station 40 may enjoy the advantage of stabilizing the power generation by using the storage cell 42. Also, the storage cell management provider 105 can collect a charge for using the storage cell from the renewable energy power station 40 and the consumer having the first consumer facility 60 or the second consumer facility 70 and pass on the charge to the installer of the storage cell 42, thereby reducing the amortization burden in respect of the installation cost of the storage cell.

Example: Control of Storage Cell of Public Facility

Now, an example of control of the storage cell 52 of the public facility 50 illustrated in FIG. 1 performed by the controller 111 of the power control apparatus 110 will be described. The public facility 50 includes the public facility apparatus 51, the storage cell 52, the smart meter 53, and the EMS apparatus 54.

During the normal operation, the public facility 50 receives the power supplied from the power grid 10 via the smart meter 53. Also, the storage cell 52 of the public facility 50 is controlled by the controller 111 of the power control apparatus 110 via the communication network 80. The controller 111 may control the storage cell 52 to charge during late night hours and discharge during a period of peak power demand. Also, the controller 111 may control the charging and discharging of the storage cell 52 to maximize a profit resulting from a difference between the power rate purchased from the power station 20, with which the power company 90 has signed a contract, and the power rate exchanged at the power trading market 30.

Also, the controller 111 receives a charging or discharging instruction from the first consumer facility 60 or the second consumer facility 70. In this case, the controller 111 controls the storage cell 42 whilst prioritizing the maximum profit resulting from the difference in the power rates, rather than following the charging or discharging instruction. That is, the controller 111 controls the storage cell 42 without necessarily following the charging or discharging instruction received from the first consumer facility 60 or the second consumer facility 70.

The storage cell management provider 105 collects payments for the use of the storage cell 52 in accordance with the usage thereof from the public facility 50 and the first consumer facility 60 or the second consumer facility 70 that issues the charging or discharging instruction for the storage cell 52, and allocates the payments to the amortization of the installation cost of the storage cell 52. Also, the storage cell management provider 105 regards, as a fund, a difference between a procurement charge of power stored in the storage cell and the electricity charge in accordance with the power consumption of the public facility 50 and the first consumer facility 60 or the second consumer facility 70, and allocates the fund to the amortization of the installation cost of the storage cell 52. In this way, the installer of the storage cell may reduce the amortization cost of the installation cost of the storage cell 52 and easily install the storage cell.

On the other hand, when disaster strikes, the power supply from the power grid 10 stops, and power from the power station 20 and the power station 31 of the power trading market 30 is not supplied to the public facility 50. In this case, the public facility 50 separates the storage cell 52, configured with the stationary storage cell, from the power grid 10. Then, the storage cell 52 discharges to supply power to the public facility apparatus 51. The public facility 50 may include a power plant capable of performing renewable energy power generation or power cogeneration such that the power plant, together with the storage cell 52, may supply power in case of disasters. In this way, the public facility 50 can fulfill its role as the recovery base in case of disasters.

It is thought that the storage cell 52 will need to have an enormous storage capacity to fulfill the role as the recovery base in the case of a disaster. Therefore, the installation cost of the storage cell 52 will be very large. However, the storage cell 52 is operated by the storage cell management provider 105 during the normal operation. Accordingly, the profit resulting from the difference between the procurement charge and the electricity charge and the virtual storage cell utilization fee collected from the consumer having the first consumer facility 60 or the second consumer facility 70 may be allocated to the amortization of the installation cost. That is, the installation cost of the storage cell is offset to lower the introduction cost of the storage cell, thus facilitating the introduction of the storage cell to the public facility.

The public facility 50 installs the storage cell 52 for the purpose of obtaining the advantage of having a backup power source in case of disaster. This advantage is dependent on the installation location of the storage cell. On the other hand, obtaining the advantage of reducing the electricity charge by utilizing the difference in the power rates between daytime and late night hours during the normal operation, that is, obtaining the advantage independent of the installation location of the storage cell, is not a primary purpose for installation of the storage cell 52 by the public facility 50. However, by providing the virtual storage cell utilization agreement using the storage cell 52 of the public facility 50, the advantage independent of the installation location of the storage cell may be offered to a consumer facility in need of this advantage. In this manner, the power control system according to the present embodiment may simultaneously meet the requirement from a consumer facility (here, the public facility 50) in need of the advantage dependent on the installation location of the storage cell and the requirement from a consumer facility (here, the first consumer facility 60) in need of the advantage independent of the installation location of the storage cell.

Second Embodiment

In the power control system according to the first embodiment, the controller 111 of the power control apparatus 110 controls the charging and discharging of the storage cell 42 or 52, and also receives the charging or discharging instruction from the first consumer facility 60, and saves the charging or discharging instruction in the memory 112. The following is a description of a second embodiment in which a control apparatus other than the power control apparatus 110 controls the charging and discharging of the storage cell. In other words, according to the second embodiment, the function of controlling the storage cell and the function of receiving the charging or discharging instruction from the consumer facility may be borne by different control apparatuses. Hereinafter, a configuration different from those in FIG. 1 will be described.

Figure 10:
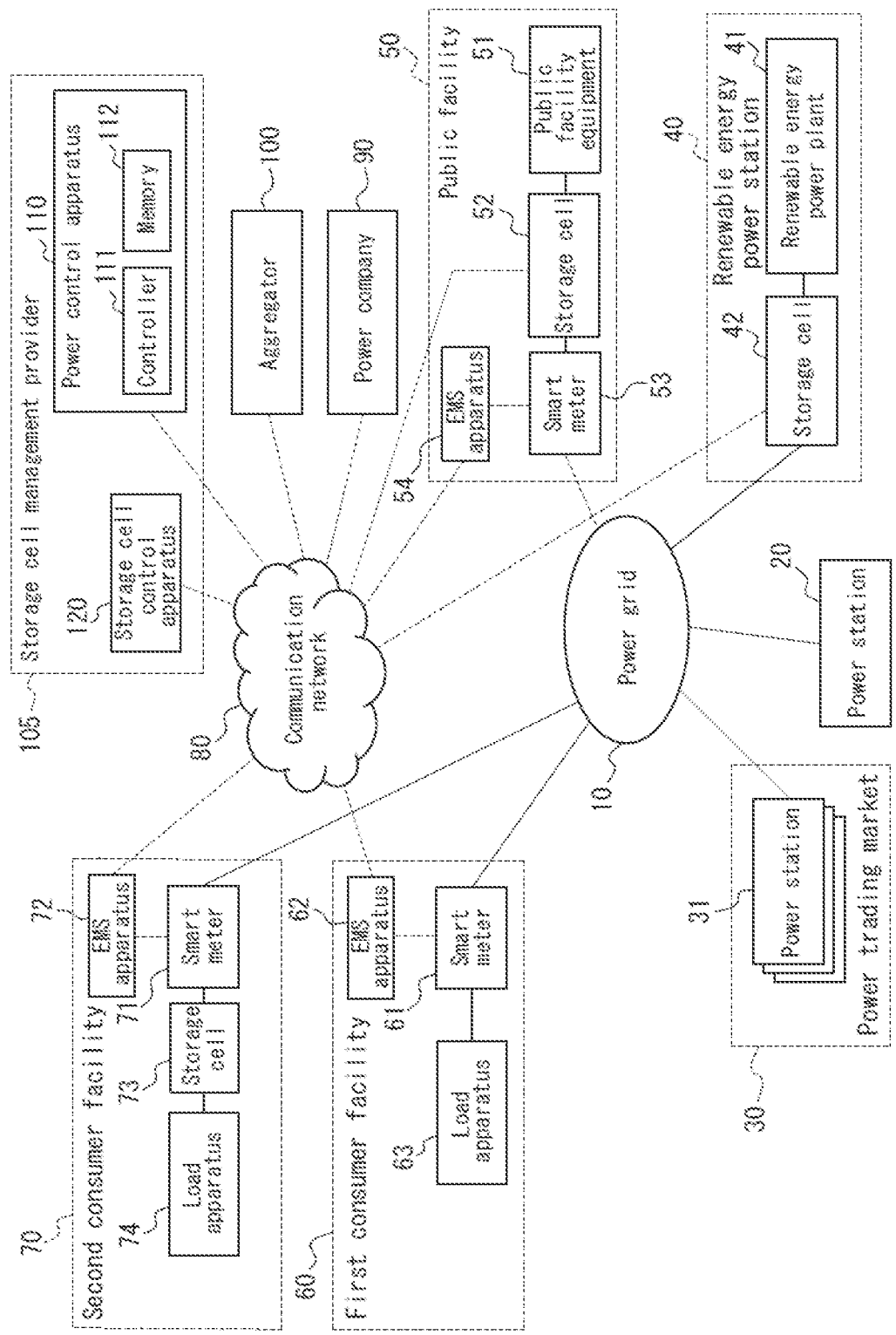
FIG. 10 is a diagram illustrating an overview of the power control system according to a second embodiment.

As illustrated in FIG. 10, the power control system according to the second embodiment includes a storage cell control apparatus 120 configured to control the charging and discharging the storage cell. The storage cell control apparatus 120 is included in the storage cell management provider 105. The storage cell control apparatus 120 is coupled to the storage cells 42 and 52 via the communication network 80.

The storage cell control apparatus 120 controls the charging and discharging of the storage cell 42 and 52 in accordance with the storage cell management policies of the storage cell management provider 105. The storage cell control apparatus 120 may control a plurality of storage cells in addition to the storage cells 42 and 52 illustrated in the figure. Also, the storage cell control apparatus 120 may be provided for each storage cell to control a corresponding storage cell. Further, the storage cell control apparatus 120 may be directly coupled to the corresponding storage cell to control, without the communication network 80. When the storage cell control apparatus 120 is directly coupled to the corresponding storage cell to control, the storage cell control apparatus 120 may be provided either inside or outside the storage cell management provider 105. When the storage cell control apparatus 120 is provided outside the storage cell management provider 105, the storage cell control apparatus 120 controls the storage cell in accordance with storage cell management policies of the installer of the storage cell.

The power control apparatus 110 of the power control system according to the second embodiment does not control the charging and discharging of the storage cell. The controller 111 of the power control apparatus 110 receives the charging or discharging instruction from the first consumer facility 60 and controls the charging and discharging amount.

The controller 111 of the power control apparatus 110, does not control the charging and discharging of the storage cell but does receive information about the storage capacity and the usage rate (the charging rate) of the storage cell from the storage cell control apparatus 120. The controller 111 allocates a storage capacity to each consumer facility on the basis of this information.

The virtual storage cell utilization agreement of the power control system according to the second embodiment may be provided in a manner similar to that of the power control system according to the first embodiment. Therefore, a description of the provision of the virtual storage cell using an agreement according to the second embodiment will be omitted.

The power control system according to the second embodiment eliminates the necessity for the power control apparatus 110 to include the function to control the storage cell, and thus enables the power control apparatus 110 to achieve the same effect as that of the power control system according to the first embodiment using a more simple configuration.

Although the disclosure herein has been described on the basis of the figures and the embodiments, it is to be understood that those who are ordinarily skilled in the art may easily implement various modifications and changes on the basis of the disclosure herein. Therefore, such modifications and changes are included in the scope of the disclosure herein. For example, functions and the like included in each constituent or step may be rearranged without logical inconsistency, so as to combine a plurality of constituents or steps together or to separate them.

The control according to the disclosure herein may be represented by a series of operations executed by a computer system or other hardware those are capable of executing a program instruction. The computer system or the other hardware include, for example, a general-purpose computer, a PC (personal computer), a special purpose computer, a workstation, PCS (Personal Communications System; a personal mobile communication system), an electronic notepad, a laptop computer, and other programmable data processing apparatuses. Note that in the embodiment of the disclosure the various operations are executed by a dedicated circuit implemented with a program instruction (software) (e.g., discrete logic gates interconnected to perform a specific function), or a logical block, a program module and the like executed by at least one processor. The at least one processor for executing the logical block, the program module and the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a controller, a microcontroller, an electronic apparatus, and other apparatuses designed to be capable of executing the functions described herein, and/or a combination thereof. The embodiment presented herein is implemented by, for example, hardware, software, firmware, middleware, a microcode, or any combination thereof.

The network used herein includes, unless otherwise specified, the Internet, an ad hoc network, LAN (Local Area Network), a cellular network, WPAN (Wireless Personal Area Network), other networks, or combinations any of them.

REFERENCE SIGNS LIST 10 power grid
20 power station
40 renewable energy power station
41 renewable energy power plant
42 storage cell
50 public facility
51 public facility apparatus
52 storage cell
53 smart meter
60 consumer facility including no stationary storage cells (first consumer facility)
61 smart meter
62 EMS apparatus (Energy Management System)
63 load apparatus
70 consumer facility including stationary storage cell (second consumer facility)
71 smart meter
72 EMS apparatus (Energy Management System)
73 storage cell
74 load apparatus
80 communication network (network)
90 power company
105 storage cell management provider
110 power control apparatus
111 controller
112 memory

The invention claimed is:

1. A power control system comprising:
a plurality of storage cells installed in a plurality of facilities; and
a power control apparatus including a controller configured to control charging and discharging of the plurality of storage cells,
wherein the controller allocates storage capacity to each of a plurality of consumers, wherein each allocated storage capacity is a portion of a total virtual capacity of the plurality of storage cells installed in the plurality of facilities, such that electrical energy may be stored for each of the plurality of consumers across the plurality of storage cells according to a charging or discharging instruction from the consumer, and wherein each allocated storage capacity for each of the plurality of consumers comprises storage capacity within a facility outside of that consumer's facility, and
wherein the controller in a case of receiving the charging or discharging instruction from a first one of the plurality of consumers,
(1) when a charging and discharging amount based on the charging or discharging instruction falls within the storage capacity allocated to the first consumer, accepts the charging or discharging instruction, and
(2) when the charging and discharging amount based on the charging or discharging instruction falls outside the storage capacity allocated to the first consumer, accepts the charging or discharging instruction, reduces the storage capacity allocated to at least a second one of the plurality of consumers by a storage capacity corresponding to a charging and discharging amount exceeding the storage capacity allocated to the first consumer, and allocates the storage capacity thus obtained to the first consumer.

2. The power control system according to claim 1, wherein:
the power control apparatus further includes a memory, and
the controller, in a case of receiving the charging or discharging instruction from the first consumer, saves the charging or discharging instruction in the memory when the charging and discharging amount falls within the storage capacity allocated to the first consumer, and does not save the charging or discharging instruction in the memory when the charging and discharging amount falls outside the storage capacity allocated to the first consumer.

3. The power control system according to claim 2, wherein the controller is configured to:
receive, from the first consumer, data indicative of electric energy supplied to a load apparatus included in the first consumer from a power grid, and
calculate an electricity charge for the first consumer on the basis of the data and the charging or discharging instruction received from the first consumer.

4. The power control system according to claim 3, wherein the controller is configured to aggregate the charging or discharging instructions from the first consumer in each time zone and calculate the electricity charge of the first consumer.

5. The power control system according to claim 2, wherein the controller is configured to control the charging and discharging of the plurality of storage cells without following the charging or discharging instructions from the plurality of consumers.

6. The power control system according to claim 1, wherein the controller is configured to:
receive, from the first consumer, data indicative of electric energy supplied to a load apparatus included in the first consumer from a power grid, and
calculate an electricity charge for the first consumer on the basis of the data and the charging or discharging instruction received from the first consumer.

7. The power control system according to claim 6, wherein the controller is configured to aggregate the charging or discharging instructions from the first consumer in each time zone and calculate the electricity charge of the first consumer.

8. The power control system according to claim 1, wherein the controller is configured to control the charging and discharging of the plurality of storage cells without following the charging or discharging instructions from the plurality of consumers.

9. A power control apparatus comprising:
a controller configured to control charging and discharging of a plurality of storage cells installed in a plurality of facilities, and allocate storage capacity to each of a plurality of consumers, wherein each allocated storage capacity is a portion of a total virtual capacity of the plurality of storage cells installed in the plurality of facilities, such that electrical energy may be stored for each of the plurality of consumers across the plurality of storage cells according to a charging or discharging instruction from the consumer, and wherein each allocated storage capacity for each of the plurality of consumers comprises storage capacity within a facility outside of that consumer's facility,
wherein the controller in a case of receiving the charging or discharging instruction from a first one of the plurality of consumers,
(1) when a charging and discharging amount based on the charging or discharging instruction falls within the storage capacity allocated to the first consumer, accepts the charging or discharging instruction, and
(2) when the charging and discharging amount based on the charging or discharging instruction falls outside the storage capacity allocated to the first consumer, accepts the charging or discharging instruction, reduces the storage capacity allocated to at least a second one of the plurality of consumers by a storage capacity corresponding to a charging and discharging amount exceeding the storage capacity allocated to the first consumer, and allocates the storage capacity thus obtained to the first consumer.

10. The power control apparatus according to claim 9, further comprising a memory, wherein, the controller in a case of receiving the charging or discharging instruction from the first consumer, saves the charging or discharging instruction in the memory when the charging and discharging amount falls within the storage capacity allocated to the first consumer, and does not save the charging or discharging instruction in the memory when the charging and discharging amount falls outside the storage capacity allocated to the first consumer.

11. The power control apparatus according to claim 10, wherein the controller is configured to:
receive, from the first consumer, data indicative of electric energy supplied to a load apparatus included in the first consumer from a power grid, and
calculate an electricity charge for the first consumer on the basis of the data and the charging or discharging instruction received from the first consumer.

12. The power control apparatus according to claim 9, wherein the controller is configured to:
receive, from the first consumer, data indicative of electric energy supplied to a load apparatus included in the first consumer from a power grid, and
calculate an electricity charge for the first consumer on the basis of the data and the charging or discharging instruction received from the first consumer.

13. A power control method of a power control apparatus including a controller configured to control a plurality of storage cells installed in a plurality of facilities, the power control method comprising, by the controller:
allocating storage capacity to each of a plurality of consumers, wherein each allocated storage capacity is a portion of a total virtual capacity of the plurality of storage cells installed in the plurality of facilities, such that electrical energy may be stored for each of the plurality of consumers across the plurality of storage cells according to a charging or discharging instruction from the consumer, and wherein each allocated storage capacity for each of the plurality of consumers comprises storage capacity within a facility outside of that consumer's facility; and
in a case of receiving the charging or discharging instruction from a first one of the plurality of consumers,
(1) when a charging and discharging amount based on the charging or discharging instruction falls within the storage capacity allocated to the first consumer, accepting the charging or discharging instruction, and (2) when the charging and discharging amount based on the charging or discharging instruction falls outside the storage capacity allocated to the first consumer, accepting the charging or discharging instruction, reducing the storage capacity allocated to at least a second one of the plurality of consumers by a storage capacity corresponding to a charging and discharging amount exceeding the storage capacity allocated to the first consumer, and allocating the storage capacity thus obtained to the first consumer.

14. The power control method according to claim 13, wherein:
the power control apparatus further includes a memory, and
the power control method further comprising, by the controller, in a case of receiving the charging or discharging instruction from the first consumer, saves the charging or discharging instruction in the memory when the charging and discharging amount falls within the storage capacity allocated to the first consumer, and does not save the charging or discharging instruction in the memory when the charging and discharging amount falls outside the storage capacity allocated to the first consumer.

15. The power control method according to claim 14, further comprising, by the controller:
receiving, from the consumer, data indicative of electric power supplied to a load apparatus included in the first consumer from a power grid, and
calculating an electricity charge for the first consumer on the basis of the data and the charging or discharging instruction received from the first consumer.

16. The power control method according to claim 13, further comprising, by the controller:
receiving, from the first consumer, data indicative of electric power supplied to a load apparatus included in the first consumer from a power grid, and
calculating an electricity charge for the first consumer on the basis of the data and the charging or discharging instruction received from the first consumer.

* * * * *